United States Patent
Candelore

(10) Patent No.: US 11,108,908 B1
(45) Date of Patent: Aug. 31, 2021

(54) CONTROL OF INCOMING CALLS BASED ON CALL SETTINGS

(71) Applicant: SONY GROUP CORPORATION, Tokyo (JP)

(72) Inventor: Brant Candelore, San Diego, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 16/914,634

(22) Filed: Jun. 29, 2020

(51) Int. Cl.
 *H04M 3/436* (2006.01)
 *H04M 1/57* (2006.01)
 *H04M 1/663* (2006.01)
 *H04M 3/42* (2006.01)

(52) U.S. Cl.
 CPC .......... *H04M 3/436* (2013.01); *H04M 1/57* (2013.01); *H04M 1/663* (2013.01); *H04M 3/42042* (2013.01); *H04M 3/42059* (2013.01)

(58) Field of Classification Search
 CPC ........ H04M 3/436; H04M 1/57; H04M 1/663; H04M 3/42059; H04M 3/42042
 USPC ........... 379/215.01, 207.15, 211.01, 210.01, 379/201.01, 201.02, 201.08, 201.11, 379/207.03, 207.02, 201.12
 See application file for complete search history.

(56) References Cited

U.S. PATENT DOCUMENTS

| | | | |
|---|---|---|---|
| 9,020,117 B2 | 4/2015 | Caceres et al. | |
| 2006/0234693 A1* | 10/2006 | Isidore | H04M 3/436 455/422.1 |
| 2014/0119527 A1 | 5/2014 | Cohen | |

OTHER PUBLICATIONS

Sachdeva, et al., "On the Viability of CAPTCHAs for Use in Telephony Systems: A Usability Field Study", Information Security, 16th International Conference, Nov. 13-15, 2013, 16 pages.
Octavio Blanco, "Robocall Bill Wins Approval in the House", Consumer Reports, Jul. 24, 2019, 09 pages.
Ben Werschkul, "Here's what's in the New Law Taking on the 'Scourge' of Robocalls", Yahoo finance, Dec. 31, 2019, 06 pages.
Ryan Tracy, "Lawmakers Unveil Bipartisan Proposal to Mitigate Robocall Scourge", The Wall Street Journal, Nov. 27, 2019, 02 pages.

* cited by examiner

Primary Examiner — Thjuan K Addy
(74) Attorney, Agent, or Firm — Chip Law Group

(57) ABSTRACT

An electronic device and method for control of incoming calls based on stored a plurality of call settings is provided. The electronic device receives a first call from a first caller party device associated with a first caller party. The electronic device transmits a first challenge message to the first caller party device based on the received first call. The electronic device further transmits a second challenge message to the first caller party device based on a first call setting of the stored plurality of call settings. The electronic device determines a time of receipt of a second call, different from the first call, received from the first caller party device. The electronic device further controls the second call based on a threshold time period, the determined time of the receipt of the second call, and a second call setting of a stored plurality of call settings.

20 Claims, 4 Drawing Sheets

CONTROL OF INCOMING CALLS BASED ON CALL SETTINGS

CROSS-REFERENCE TO RELATED APPLICATIONS/INCORPORATION BY REFERENCE

None.

FIELD

Various embodiments of the disclosure relate to control of incoming calls based on call settings. More specifically, various embodiments of the disclosure relate to an electronic device and method for control of incoming calls based on call settings.

BACKGROUND

With the advancements in technologies related to telephonic communication, various techniques have been developed to make a robocall to multiple people from an unknown calling number. The robocalls may deliver a pre-recorded message to a recipient of the call, where the pre-recorded message may be used for campaigning or telemarketing. Certain solutions (e.g. blacklists or whitelists) have been developed at the end of network devices or at recipient devices, to identify and/or filter-out such robocalls. Such solutions may not be effective enough to accurately distinguish or filter-out the robocalls from human calls, which may further lead to loss of important calls received at the recipient devices. Such receipt of robocalls or loss of important calls may not be desired by various recipients.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for control of incoming calls based on call settings is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
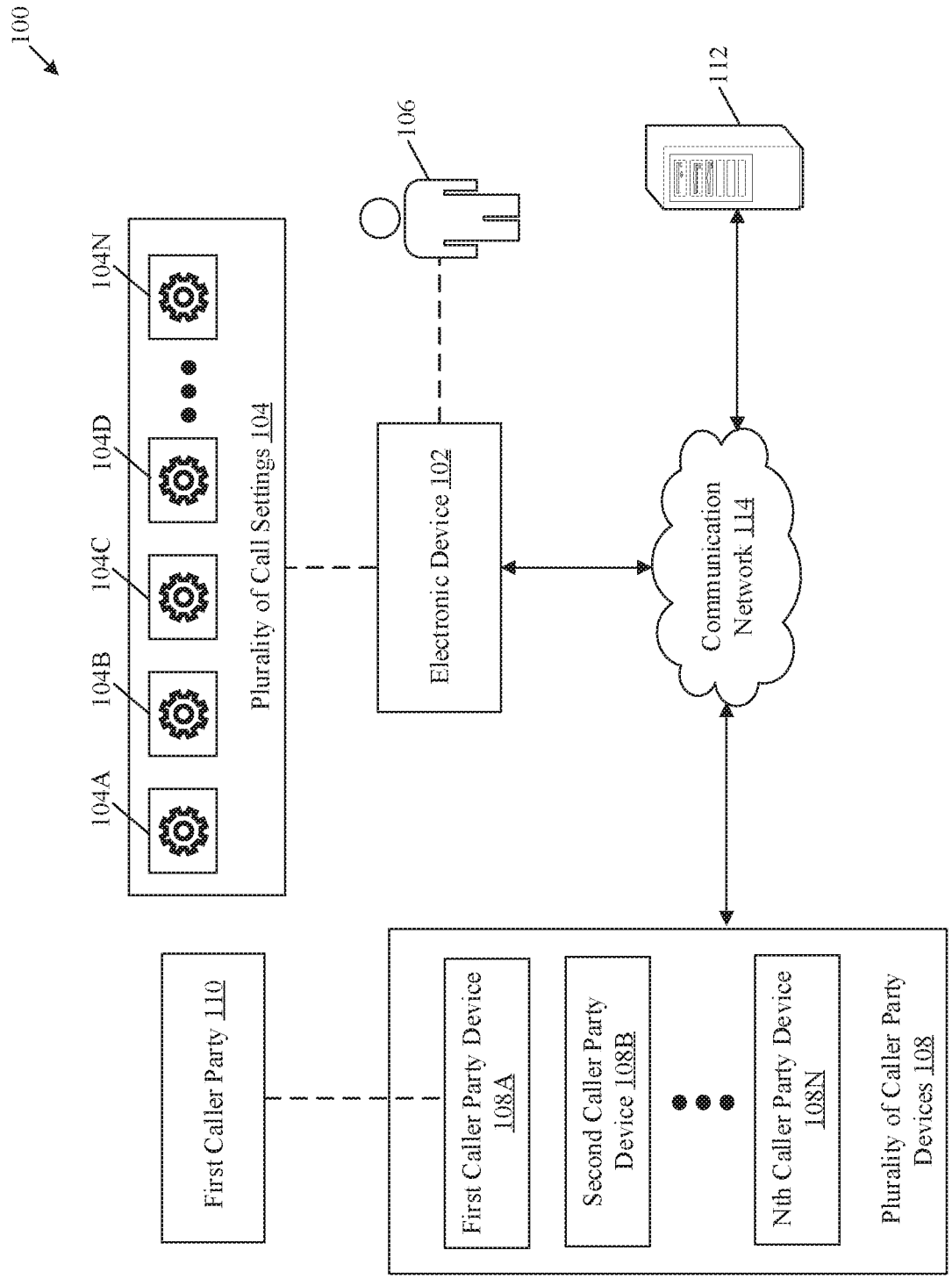
FIG. 1 is a diagram that illustrates an exemplary network environment for control of incoming calls based on call settings, in accordance with an embodiment of the disclosure.

The following described implementations may be found in the disclosed electronic device and method for control of incoming calls based on call settings, which may be pre-stored to filter-out robocalls and store the incoming call on a server such a voicemail. Exemplary aspects of the disclosure provide an electronic device (for example, a mobile phone) that may receive a first call (for example, a telephone call, a voice over internet protocol call) from a caller party device (for example, another mobile phone, a communication device, a computer, etc.), associated with a caller party (for example, a person, or a computer, or a robot). In an embodiment, identification information (for example a phone number, a caller identification) of the caller party device or a caller party may be unknown to the electronic device. The electronic device may further transmit a first challenge message (such as a CAPTCHA question to distinguish a robot caller from a human caller) to the caller party device associated with the caller party, based on the received first call. The electronic device may further transmit a second challenge message to the caller party device based on a first call setting of a plurality of call settings, which may be stored in a memory of the electronic device. The second challenge message may be another message (different from the first challenge message) to accurately distinguish the robot caller from the human caller. The first call setting may be associated with the transmitted first challenge message. The second challenge message may indicate a request for the caller party device to again call the electronic device within a threshold time period. The electronic device may further determine a time of receipt of the second call received from the caller party device. The electronic device may further control the second call based on the threshold time period, the determined time of receipt of the second call, and a second call settings of the stored plurality of call settings. The control of the second call may correspond to generation of an alert (i.e. generation of audio ring) on the electronic device about the second call or may correspond to a transmission of the second call to a server (i.e. local or network voicemail).

The disclosed electronic device may automatically determine the identification information of the caller party device associated with each call based on data gathered from one or more of other electronic device, a plurality of partners (third-parties), or a network service provider associated with the disclosed electronic device. The disclosed electronic device may further transmit the first challenge message to the caller party device, and based on the response received from the caller party device, the electronic device may further take an action to control the call. The action may correspond to transfer of the received call to the server (like voicemail) or to transmit the second challenge question to the caller party device to further identify the robocalls and the human callers (i.e. who may correctly respond to the first challenge message and the second challenge message).

Therefore, the disclosed electronic device follows a three-step approach (i.e. determination of identification information and control of the challenges messages) to identify and filter-out the potential robocalls from the human callers. Even if the caller party answers the first question challenge message, the caller party may have to fulfill another filter criteria to call again within the threshold time period (i.e. as mentioned in the second challenge message). Multiple challenge messages and the filter criteria may be indicated by the stored plurality of call settings of the electronic device, which have to be fulfilled by the caller party or the caller party device to further alert a user associated with the electronic device about the received call. The disclosed electronic device may continue to suppress the alert or notification of the second call until the criteria mentioned in the second challenge message or corresponding call setting is fulfilled. Thus, the disclosed electronic device may control the incoming calls based on stored call settings which may avoid receipt of robocalls to further enhance user experience with the electronic device. Further, based on the stored plurality of call settings, the disclosed electronic device may also transmit/redirect each potential call (either robocall or human call) to the server (voicemail) for storage of the calls, so that the user may have access to all important calls or information that have been transmitted to the server, for future review and use.

FIG. 1 is a diagram that illustrates an exemplary network environment for control of incoming calls based on call settings, in accordance with an embodiment of the disclosure. With reference to FIG. 1, there is shown a diagram of a network environment 100. The network environment 100 may include an electronic device 102 that may store a plurality of call settings 104 to handle each of a plurality of incoming calls received on the electronic device 102. The electronic device 102 may be further associated with a user 106. With reference to FIG. 1, there is further shown a plurality of caller party devices 108, a first caller party 110 (i.e. that may be associated with a first caller party device 108A of the plurality of caller party devices 108), and a server 112. The electronic device 102 may be communicatively coupled to the plurality of caller party devices 108, and the server 112, via a communication network 114.

The electronic device 102 may include suitable logic, circuitry, interfaces, and/or code that may be configured to receive a first call or a second call from the first caller party device 108A associated with the first caller party 110. The electronic device 102 may be further configured to determine whether the received first call or the second call is a robocall. The electronic device 102 may be further configured to control the received first call or the second call based on the determination that the received calls are the robocalls or calls from a human being. Examples of the electronic device 102 may include, but are not limited to, a telephone, a smartphone, a cellular phone, a mobile phone, a personal digital assistant (PDA) device, a tablet, a gaming device, a computing device, a mainframe machine, a server, a computer work-station, an imaging device, and/or a consumer electronic (CE) device that may have a capability to receive and process network calls.

The plurality of call settings 104 may include a plurality of rules and/or actions that may be performed by the electronic device 102 to handle or control each of the plurality of incoming calls that may be received on the electronic device 102 from the plurality of caller party devices 108. The plurality of call settings 104 may include a first call setting 104A, a second call setting 104B, a third call setting 104C, a fourth call setting 104D, and an Nth call setting 104N. Each of the plurality of call settings 104 may be applicable to each incoming call in a particular pre-defined sequence. In some embodiments, a particular call setting of the plurality of call settings 104 may be applicable on the incoming call based on a result of a previous call setting of the plurality of call settings 104. For example, the second call setting 104B may be applicable based on the result of the application of the first call setting 104A on the incoming call. The details about the plurality of settings 104 is described, for example, in FIG. 3. In some embodiments, the plurality of call settings 104 may be associated with a software application installed on the electronic device 102. The electronic device 102 may apply each of the plurality of call settings 104 on the incoming calls based on execution of the software application (for example an application related to incoming calls, such as a dialer application or another application configured to work with the dialer application).

The plurality of caller party devices 108 may include suitable logic, circuitry, interfaces, and/or code that may be configured to initiate a call to the electronic device 102 associated with the user 106 (i.e. recipient of the call). The plurality of caller party devices 108 may include the first caller party device 108A, a second caller party device 108B, and an Nth caller party device 108N. Each of the plurality of caller party devices 108 may be associated with a corresponding caller party. For example, the first caller party device 108A may be associated with the first caller party 110. Similarly, the second caller party device 108B may be associated with a second caller party (not shown). Each of the plurality of caller party devices 108 may have corresponding identification information (for example a phone number). In an embodiment, the identification information of the first caller party device 108A associated with the first caller party 110 may be unknown to (or not stored in) the electronic device 102, whereas the identification information of the second caller party device 108B associated with the second caller party may be known to (or stored in) the electronic device 102. Examples of the each of the plurality of caller party devices 108 may include, but are not limited to, a telephone, a smartphone, a cellular phone, a mobile phone, a personal digital assistant (PDA) device, a tablet, a gaming device, a computing device, an imaging device, a mainframe machine, a server, a computer work-station, and/or a consumer electronic (CE) device that may have the capability to initiate network calls.

The first caller party 110 may correspond to a person (human being) or a computer (for example a robot) that may initiate the calls, via the first caller party device 108A, to the electronic device 102. In case, the first caller party 110 is the person or human being, the first call may be considered as a genuine call by the electronic device 102. In case the first caller party 110 is the computer or the robot, the first call may be considered as the robocall because the robocalls may originate from the computer (or from the robot or an automated machine) and may include or deliver a pre-recorded message. The electronic device 102 may send the robocalls to the voicemail (i.e. server 112) for later review.

The server 112 may include suitable logic, circuitry, interfaces, and/or code that may be configured to store the first call or a second call received from the first caller party 110. In some embodiments, the server 112 may store a message or information (like in textual format) related to the first call or the second call received from the first caller party 110. The server 112 may be further configured to convert the stored first call or the second call from a first format (i.e. audio format) to a second format (say textual format) to store the message or the information related to the first call or the second call. The message or the information in the second format may consume less memory size as compared to the memory size consumed by the first call or the second call in the first format (i.e. audio format). In an embodiment, the server 112 may include an audio-to-text (or speech to text) converter that may convert the first call or the second call from the audio format to the textual format. The server 112 may be further configured to transmit the converted message/information (in the textual format) of the first call or the second call to the electronic device 102 or to an email server associated with the electronic device 102. In some embodiments, the server 112 may transmit the first call or the second call in the audio format or as an audio attachment, (like ".wav" file). In some embodiments, the server 112 may be configured to store the identification information associated with the plurality of caller party devices 108 or a plurality of caller parties that may also include the first caller party 110.

The server 112 may be implemented as a network voicemail. The server 112 may also be implemented as a cloud server and may execute operations through web applications, cloud applications, HTTP requests, repository operations, file transfer, and the like. Other example implementations of the server 112 may include, but are not limited to, a call server, a database server, a file server, a web server, a media server, an application server, a mainframe server, or a cloud computing server. In at least one embodiment, the server 112 may be implemented as a plurality of distributed cloud-based resources by use of several technologies that are well known to those ordinarily skilled in the art. A person with ordinary skill in the art will understand that the scope of the disclosure may not be limited to the implementation of the server 112 and the electronic device 102 as two separate entities. In certain embodiments, the functionalities of the server 112 can be incorporated in its entirety or at least partially in the electronic device 102, without a departure from the scope of the disclosure. In such case, the server 112 may be considered as a local voicemail incorporated in the electronic device 102.

The communication network 114 may include a communication medium through which the electronic device 102, the plurality of caller party devices 108, and the server 112 may communicate with each other. The communication network 114 may be a wired or wireless communication network. In some embodiments, the electronic device 102 may receive the first call or the second call from the first caller party device 108A via the communication network 114. The communication network 114 may include a telecommunication network to handle telephonic calls (such as the first call or the second call) between the plurality of caller party devices 108 and the electronic device 102. In such case, the communication network 114 may include different telephonic networks, such as (but are not limited to), a cellular network, a mobile network, a public switched telephonic network (PSTN), a radio access network (RAN) device, an integrated service digital network (ISDN), or a voice over internet protocol (VOIP) network. Other examples of the communication network 114 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive user inputs from the user 106, to configure one or more of the plurality of call settings 104 to handle (i.e. also referred as control) each of the plurality of incoming calls on the electronic device 102. The configuration of each of the plurality of call settings 104 may correspond to configuration of rules that may be checked, and corresponding actions may be performed by the electronic device 102 to handle each incoming call received from each of the plurality of caller party devices 108. In some embodiments, each of the plurality of call settings 104 may be configured based on the user inputs received from the user 106 associated with the electronic device 102. In some other embodiments, a set of call settings of the plurality of call settings 104 may be configured based on the received user inputs, while remaining call settings of the plurality of call settings 104 may be defined as default by the electronic device 102. After the configuration of the plurality of call settings 104, the electronic device 102 may be configured to store the plurality of call settings 104 and may apply one or more of the plurality of call settings 104 on each incoming call.

In an embodiment, the electronic device 102 may be configured to receive an incoming call (for example the first call) from the first caller party device 108A associated with the first caller party 110. The electronic device 102 may further apply an initial call setting (i.e. referred as the third call setting 104C) to the received first call. In the initial call setting, the electronic device 102 may determine a caller identification (ID) or identification information associated with the first call. The caller ID associated with the first call may correspond to a telephone number of the first caller party device 108A from which the first call originated. The electronic device 102 may further search the determined caller ID in a set of white-listed contacts (i.e. contact list) that may be stored in the electronic device 102 or associated with a user profile of the user 106. In an embodiment, in case the determined caller ID is present in the stored set of white-listed contacts, the electronic device 102 may consider that the identification information of the first caller party 110 is known to the electronic device 102. In such a scenario, the electronic device 102 may alert the user 106 about the first call and may not apply the remaining call settings of the plurality of call settings 104 on the received first call.

In another embodiment, the identification information or the caller ID of the first caller party device 108A or the first caller party 110 of the first call may be unknown to the electronic device 102, where the determined caller ID of the first call may not be present in the stored set of white-listed contacts. The identification information of the first caller party device 108A or the first caller party 110 may include, but is not limited to, a telephone number of the first caller party device 108A, a name associated with the first caller party 110, robocall information associated with the first caller party 110, or an organization name associated with the first caller party 110. In an embodiment, the electronic device 102 may determine the identification information of the first caller party device 108A or the first caller party 110 based on data collected from a plurality of third-parties (not shown) that may store the identification information of the plurality of caller parties or the plurality of caller party devices 108. The plurality of third-parties may have collected the data from multiple users about the identification information about the plurality of caller parties or the plurality of caller party devices 108. In some embodiments, the identification information about the plurality of caller parties or the plurality of caller party devices 108 may be stored in the server 112. The electronic device 102 may receive the identification information about the first caller party device 108A from the server 112 or from another server (not shown) associated with the communication network 114 or associated with a service provider of the first caller party device 108A from which the first call may be originated.

Based on the determination of the identification information, the electronic device 102 may be further configured to control the first call based on the determined identification information and the third call setting 104C. In case, the robocall information in the identification information of the first caller party 110 indicates that the first caller party 110 is a computer/robot, the electronic device 102 may transfer the first call to the server 112 based on the third call setting 104C. In case the robocall information in the identification information of the first caller party 110 indicates that the first caller party 110 may not be the computer/robot, the electronic device 102 may transmit the first challenge message (including a first challenge question) to the first caller party device 108A associated with the first caller party 110.

The electronic device 102 may further transmit the first challenge message to the first caller party device 108A based on the determination that the first call may not be the robocall, as identified based on the determined identification information of the first caller party 110. In such case, the first caller party 110 may be the human caller. The first challenge message including the first challenge question may include at least one of an arithmetic question, a reasoning question, an audio related question, a timing related question, an image based question, a request to press a button question, or a logical question. The first caller party device 108A may be configured to receive the first challenge question message and may provide a first response of the transmitted first challenge message to the electronic device 102. The details about the first challenge message are described, for example, in FIG. 3.

The electronic device 102 may further receive the first response of the first challenge message from the first caller party device 108A. The electronic device 102 may be further configured to compare the received first response with a predefined response indicated by the first call setting 104A related to the first challenge message. The predefined response indicated by the first call setting 104A may correspond to a correct answer of the transmitted first challenge message (including the challenge question).

In an embodiment, the received first response and the response indicated by the first call setting 104A may be different. In such case, the electronic device 102 may be configured to transmit the first call to the server 112 (i.e. voice mail) and may further generate an alert on the electronic device 102 about the transmission of the first call to the server 112. In another embodiment, the received first response and the response indicated by the first call setting 104A may be similar. In such case, the electronic device 102 may be configured to transmit the second challenge message to the first caller party 110 via the first caller party device 108A, based on the first call setting 104A of the stored plurality of call settings 104. The second challenge message may indicate a request for the first caller party 110 to call the electronic device 102 again within a threshold time period (for example within 15 minutes). The electronic device 102 may be further configured to disconnect or drop the received first call after the indication of the request in the transmitted second challenge message.

In an embodiment, the electronic device 102 may be further configured receive the second call from the first caller party device 108A. The electronic device 102 may further determine the identification information in the second call, and compare the identification information in the first call with the identification information in the second call to determine whether the second call originated from the first caller party device 108A or not. In case the second call originated from a caller party which may be other than the first caller party 110 (i.e. the identification information in the second call is different from the identification information in the first call), the electronic device 102 may further control the second call based on the third call setting 104C of the stored plurality of call settings 104. In case, the second call originated from the same first caller party device 108A or the first caller party 110 (i.e. the identification information in the second call is same as the identification information in the first call), the electronic device 102 may further determine a time of receipt of the second call and a time of receipt of the first call, when received from the first caller party device 108A. The electronic device 102 may further calculate a time difference between the determined time of receipt of the first call and the determined time of receipt of the second call, and compare the calculated time difference with the threshold time period indicated in the second challenge message and in the second call setting 104B of the plurality of call settings 104. In case, the calculated time difference is greater than the threshold time period, the electronic device 102 may transmit the second call to the server 112 and generate the alert on the electronic device 102 about the transmission of the second call to the server 112. In another embodiment, when the calculated time difference is less than or equal to the threshold time period, the electronic device 102 may generate the alert about the receipt of the second call (i.e. for example via a display of a user interface (UI) on a display screen (not shown) of the electronic device 102) for the user 106 based on one of the plurality of call settings 104. The details about the plurality of call settings 104 and the control of the incoming calls are further described, for example, in FIG. 3.

Figure 2:
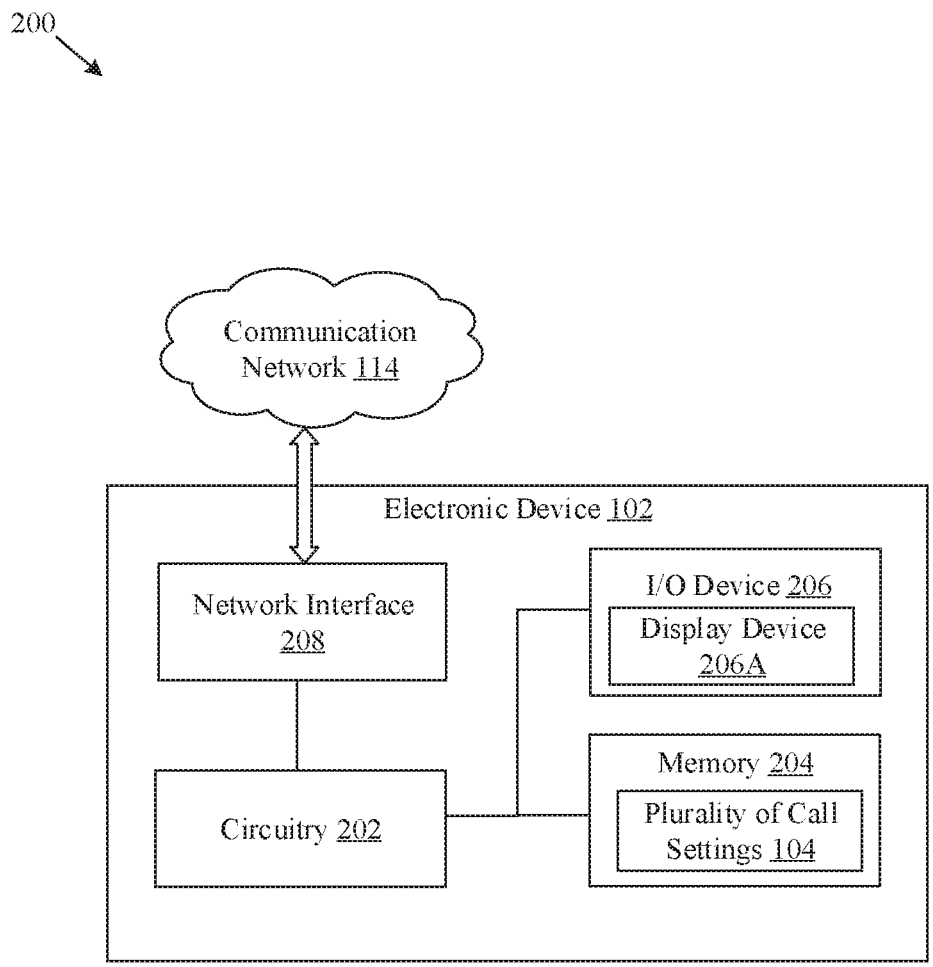
FIG. 2 is a block diagram that illustrates an exemplary electronic device for control of incoming call based on call settings, in accordance with an embodiment of the disclosure.

FIG. 2 is a block diagram that illustrates an exemplary electronic device for control of incoming call based on call settings, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. The circuitry 202 may be communicatively coupled to the memory 204, the I/O device 206, and the network interface 208. The I/O device 206 may further include a display screen 206A.

The circuitry 202 may include suitable logic, circuitry, and interfaces that may be configured to execute program instructions associated with different operations to be executed by the electronic device 102. For example, some of the operations may include, but are not limited to, receipt of a first call, transmission of a first challenge message, transmission of a second challenge message, reception of the second call, determination of a time of receipt of the second call, and control of the second call. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. In at least one embodiment, the memory 204 may store the plurality of call settings 104. The memory 204 may also store the time of receipt of the first call and the time of receipt of the second call. In some other embodiments, the memory 204 may also store a plurality of first challenge messages that may also include the first challenge message, and store a plurality of responses (i.e. correct answers) corresponding to each of the plurality of first challenge messages. In some other embodiments, the memory 204 may also store the identification information of the plurality of caller parties that may also include the first caller party 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the electronic device 102 may receive user input from the user 106, via the I/O device 206. The user input may be to accept or reject the received first call or the second call at the electronic device 102. The electronic device 102 may control the I/O device 206 to display the alert or notification of the received first call or the second call for the user 106. The I/O device 206 which includes various input and output devices, may be configured to communicate with the circuitry 202. Examples of the I/O device 206 may include, but are not limited to, a touch screen, a keyboard, a vibration motor, a mouse, a joystick, a microphone, a display device (such as the display screen 206A), and a speaker.

The display screen 206A may include suitable logic, circuitry, and interfaces that may be configured to display the alert or notification of the first call or the second call. The display screen 206A may be a touch screen which may enable the user 106 to provide the user-input via the display screen 206A. The touch screen may be at least one of a resistive touch screen, a capacitive touch screen, or a thermal touch screen. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may include suitable logic, circuitry, and interfaces that may be configured to facilitate a communication between the circuitry 202, the plurality of caller party devices 108 (including the first caller party device 108A), and the server 112, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions or operations executed by the electronic device 102, as described in FIG. 1, may be performed by the circuitry 202. Operations executed by the circuitry 202 are described in detail, for example, in FIGS. 3, and 4.

Figure 3:
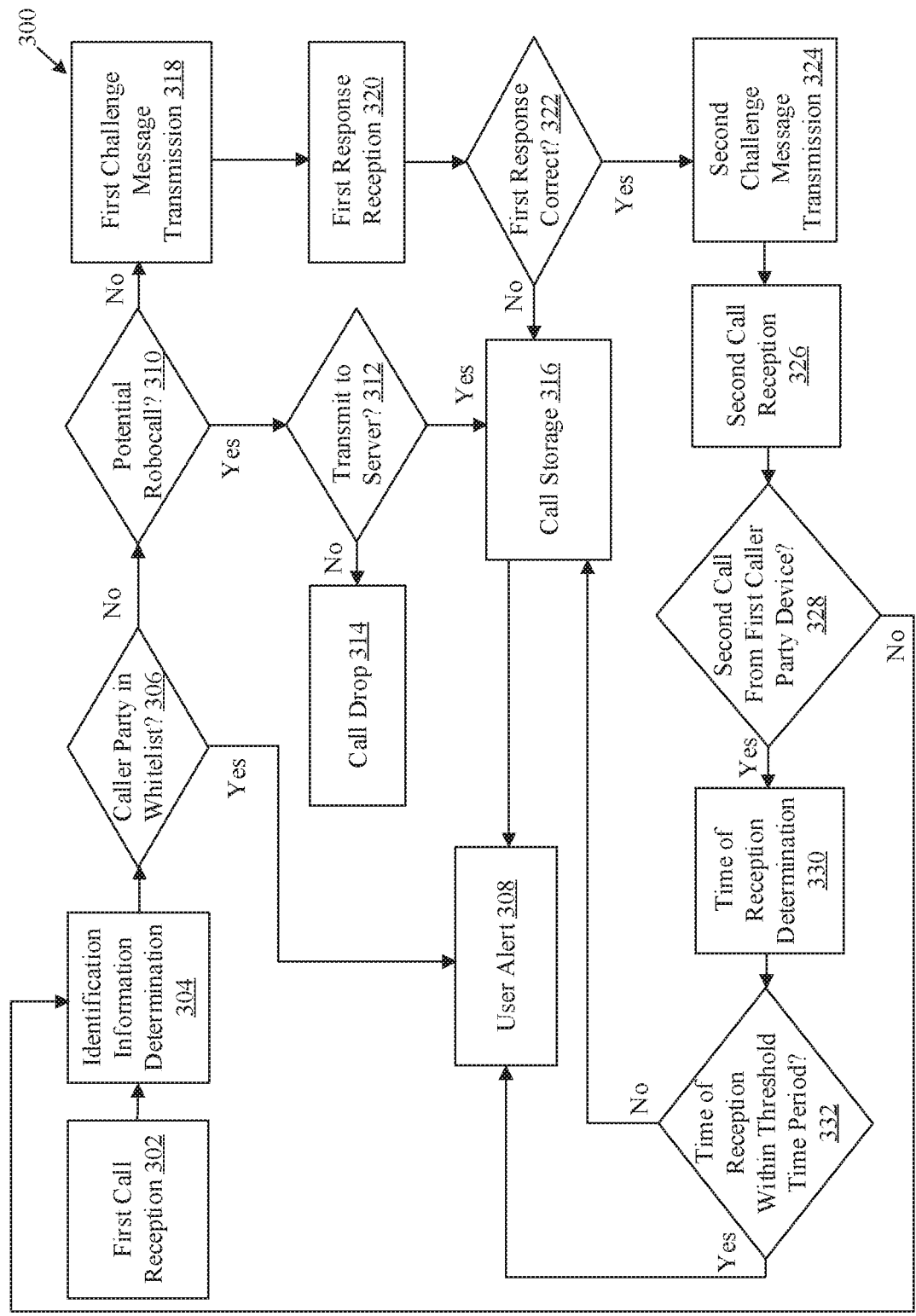
FIG. 3 is a diagram that illustrates exemplary operations for control of incoming calls based on call settings, in accordance with an embodiment of the disclosure.

FIG. 3 is a diagram that illustrates exemplary operations for control of incoming calls based on call settings, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 332, as described herein. The exemplary operations illustrated in the block diagram 300 may start at 302 and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302, a first call reception operation may be performed. In the first call reception operation, the circuitry 202 may receive the first call, as an incoming call, from the first caller party device 108A, via the communication network 114. The first caller party device 108A may be associated with the first caller party 110 that may be a human or a computer/robot. Examples of the first call may include, but is not limited to, a phone call, a telephonic call, an internet call, a VoIP call, or a chat messenger call. In case, the first call is a robocall (i.e. from an automated machine as the first caller party 110), the circuitry 102 may not alert the user 106 about the received first call, and may control the speaker (associated with the electronic device 102) to suppress a particular sound notification about the incoming call, and/or may control the display screen 206A of the electronic device 102 to not display the UI related to the incoming call (i.e. first call).

At 304, identification information determination operation may be performed. In the identification information determination operation, the circuitry 202 may be configured to determine the identification information of the first caller party device 108A or the first caller party 110 related to the incoming first call. The identification information may include, but is not limited to, a telephone number (caller ID) of the first caller party device 108A, a name associated with the first caller party 110, robocall information associated with the first caller party 110, and an organization associated with the first caller party 110. The robocall information associated with the first caller party 110 may provide a probability or indication that the received first call may be a robocall.

In some embodiments, information about the telephone number or the caller ID may be included in the received first call. The circuitry 202 may be configured to extract the telephone number or the caller ID of the first caller party device 108A or the first caller party 110, from the received first call. The extracted telephone number or the caller ID may be considered as the identification information of the first caller party device 108A from which the first call received. In some embodiments, the name of the first caller party 110 may be determined as the identification information based on the extracted telephone number or the caller ID. For example, the circuitry 202 may search the telephone number (extracted from the first call), in the contact list stored in the electronic device 102 to determine the name (i.e. identification information) of the first caller party 110 from whom the first call may be originated, via the first caller party device 108A. In an embodiment, the name of the first caller party 110 may be included in the received first call. The name of the first caller party 110 may be included in the first call by the first caller party device 108A or by the service provider associated with the first call. The circuitry 202 may extract the name of the first caller party 110 from the received first call to determine the identification information.

In some embodiments, the circuitry 202 may determine the identification information (i.e. name) of the first caller party 110 based on the determined caller ID (for example telephone number) and the data collected from a plurality of third-parties that may have the identification information (for example name) of the first caller party 110. The plurality of third-parties may have the data that may be collected from multiple users. The data may include the identification information about the plurality of caller parties that may also include the first caller party 110. For example, the multiple users (such as the first caller party 110 or the user 106) may upload or mention their corresponding data (i.e. telephone numbers or names) on different websites (such as social networking, ecommerce, or marketing websites). The plurality of third-parties may extract the identification information of the first caller party 110 based on the data extracted from such websites. The collection of the data (i.e. telephone number, names, or other personal details) from multiple or crowd of users may be referred as crowdsourcing approach performed by the plurality of third-parties. At the time of receipt of the first call, the circuitry 202 may send a request (including the call details like telephone number) to one of the plurality of third-parties to provide the identification information for the first call. Based on the sent request, the circuitry 202 of the electronic device 102 may receive the identification information (like name) of the first caller party 110 or the first caller party device 108A from the one of the plurality of third-parties or a server related to the one of the plurality of third-parties.

In an embodiment, the circuitry 202 may determine the robocall information from the determined or received the identification information. For example, the robocall information (i.e. included in the identification information) received from one of the plurality of third-parties (or from the service provider) may indicate that the received first call may be originated from the robot or the automated machine, not from a communication device associated with the human being. The plurality of third-parties may store such robocall information about the plurality of caller party devices 108 in the associated servers. The robocall information may be provided by the multiple or crowd users to the plurality of third-parties. In some embodiments, the circuitry 202 may also determine a name of the organization (i.e. associated with the first caller party 110) from the received first call. The circuitry 202 may determine the identification information as the name of the organization (for example an employer of a calling party) based on information received from one of the plurality of third-parties at the time of receipt of the first call. In some embodiments, the plurality of third-parties may receive the robocall information included in a plurality of reports or feedback provided by the multiple or crowd users (like plurality of caller parties including the first caller party 110).

In another embodiment, the circuitry 202 may receive the identification information of the first caller party 110 or the first caller party device 108A from a server (not shown) associated with a service provider of the electronic device 102. The user 106 may be a customer of the service provider associated with the electronic device 102. In an embodiment, the server of the service provider of the electronic device 102 may be same as the server 112 (i.e. voicemail), where the first call or the second call may be stored.

At 306, it may be determined whether information about the caller party (i.e. the first caller party device 108A or the first caller party 110) is in a whitelist (or in contact list) of the electronic device 102. The operation at 306 may correspond to an application of an initial call setting (i.e. the third call setting 104C) of the stored plurality of call settings 104. The third call setting 104C of the plurality of call settings 104 may be associated with the first call received from the first caller party device 108A (related to the first caller party 110). As per the third call setting 104C, the circuitry 202 may determine whether the determined or received identification information (for example the phone number or caller ID) of the first caller party device 108A (or the first caller party 110) may be stored in the contact list of the electronic device 102 or not. With the storage of the identification information in the contact list, the circuitry 202 may consider the received first call as the white-listed call and the identification information of the first caller party device 108A known to the electronic device 102. In case, the identification information of the first caller party device 108A or the first caller party 110 is not present in the contact list or may be unknown to the electronic device 102, the circuitry 202 may apply a fourth call setting 104D (i.e. described at 310) of the plurality of call settings 104. In case, the identification information of the first caller party device 108A (or the first caller party) is present in the contact list (i.e. whitelist) or may be known to the electronic device 102, the circuitry 202 may apply the third call setting 104C on the received first call. Based on the third call setting 104C, the circuitry 202 may control the first call, where the third call setting 104C may include instructions to alert the user 106 (308) about the receipt of the first call. In some embodiments, the third call setting 104C may include instruction to stop execution of other call settings present in the plurality of call settings 104. In some embodiments, the third call setting 104C may be the initial call setting that may be applicable on the received first call from the first caller party device 108A. It may be noted that 306 or the third call setting 104C is described with respect to the received first call. However, the third call setting 104C may be applicable to each incoming call received on the electronic device 102 irrespective of the caller party associated with the incoming call.

At 308, a user alert operation may be performed. In the user alert operation, the circuitry 202 may be configured to alert the user 106 about the incoming call. The circuitry 202 may control the display screen 206A (in FIG. 2) of the electronic device 102 to display a user interface (UI) on which the caller ID of the first caller party device 108A may be displayed. In some embodiments, the UI may also display information such as a name, work details, etc. associated with the caller ID of the incoming first call. Such information (i.e. name) may be stored in the contact list of the electronic device 102 corresponding to the caller ID. The UI may also include a plurality of UI elements to assist the user 106 to accept or reject the incoming call. In some embodiments, the circuitry 202 may also control the speaker associated with the electronic device 102 to output a particular sound that may alert the user 106 about the incoming call. In some other embodiments, the electronic device 102 may also control the vibration motor installed in the electronic device 102 to vibrate to further alert the user 106 about the incoming call. It may be noted that the 308 is described with respect to the received first call. However, the 308 may be applicable to other calls (such as the second call) that may be received on the electronic device 102 from the same or different caller party devices of the plurality of caller party devices 108.

At 310, it may be determined whether or not the received first call is a potential robocall. The operation at 310 may correspond to the application of the fourth call setting 104D of the stored plurality of call settings 104. The fourth call setting 104D may indicate a user preference for each call for which the corresponding identification information (i.e. determined at 304) may be unknown to the electronic device 102. The fourth call setting 104D may include instructions to either transfer the call for which the corresponding identification information is unknown to the electronic device 102, to the server 112, or to transmit the first challenge message (at 318) to the caller party associated with each call for which the corresponding identification information is unknown to the electronic device 102.

In an embodiment, the circuitry 202 may determine the received first call being the potential robocall based on the robocall information in the identification information of the first caller party 110 or the first caller party device 108A (determined at 304). Based on the fourth call setting 104D, the circuitry 202 may transmit the received first call to the server 112 or transmit the first challenge message to the first caller party device 108A (at 318). In an embodiment, the robocall information may indicate a probability value (between '0' to '1') for the received first call being the robocall or not received from the human being. As per the fourth call setting 104D, the circuitry 202 may compare the probability value indicated by the robocall information with a threshold value. The circuitry 202 may transmit the received first call to the server 112 or transmit the first challenge message to the first caller party 110 (318) based on the comparison. For example, if the probability value in the robocall information is greater than the threshold value, the circuitry 202 may determine that the received first call may be the potential robocall. In such a scenario, the control may pass to 312. In another example, if the probability value in the robocall information is less than or equal to the threshold value, the circuitry 202 may determine that the received first call may not a potential robocall or may be received from a device associated with the human being. In such case, (as the probability value of the robocall is low), the control may pass to 318 where the first challenge message may be transmitted to the first caller party device 108A to confirm the robocaller or human caller.

At 312, it may be determined whether the first call to be transmitted to the server 112 for storage or not. In some embodiments, the 312 may correspond to the fourth call setting 104D which may indicate whether the user 106 prefers to store each of the received calls (that may be potential robocalls) to the server 112 (i.e. voicemail) or to drop/reject each of the received calls that may be determined as potential robocalls. In some embodiments, the circuitry 202 may receive the user input from the user 106, via the I/O device 206 to reject or drop the first call and also automatically store the rejected call on the server 112 or in the memory 204. Based on the user preference of the user 106 indicated in the stored fourth call setting 104D, the control may pass to 314 or to 316. In an embodiment, the circuitry 202 may be configured to retrieve the fourth call setting 104D from the plurality of call settings 104 stored in the memory 204 to identify the user preference for the received calls which may be unknown to the electronic device 102 or may be potential robocalls.

At 314, a call drop operation may be executed. In the call drop operation, the electronic device 102 may drop or reject the received first call based on the user preference indicated in the fourth call setting 104D. In some embodiments, the circuitry 202 may alert the user 106 about the received or dropped first call as determined as the potential robocall. The set of operations may end as shown in FIG. 3.

At 316, the first call may be transmitted to the server 112 for storage based on the user preference indicated in the fourth call setting 104D. In some embodiments, the server 112 may be implemented as a network voicemail. The server 112 may be configured to store the first call (in a first format such as an audio format). The server 112 may convert the received first call (or the second call) from the audio format to a second form (say textual format) and may further re-store the converted first call (or the second call) to save memory size.

In an embodiment, the circuitry 202 may transmit a request to the server 112 retrieve the first call or the second call from the server 112. The server 112 may be configured to convert the stored first call (or the second call) from the first format (in audio format) to the second format based on the received request from the electronic device 102. The second format may correspond to, but is not limited to, a textual format. In an embodiment, the server 112 may include an audio-to-text engine (not shown) that may generate the textual transcript of the first call or the second call (in the audio format). It may be noted that a file size of the second format may be less than the file size of the first format. Therefore, information about the calls in the second format may consume less memory (such as the memory 204) for storage and less bandwidth for the transmission to the electronic device 102 compared to size of the memory 204 and bandwidth required for the calls in the first format, respectively. The server 112 may further transmit the converted information or message about the first call (in the second format) to the electronic device 102. In some embodiments, the server 112 may retrieve the stored first call or the second call and transmit to the electronic device 102 in the audio form, without conversion, based on the request received from the electronic device 102.

In an embodiment, the server 112 may be configured to send the converted information or message to an e-mail server associated with the electronic device 102. In some embodiments, the server 112 may store the converted information or message about the first call or the second call.

Based on the request received from the electronic device 102, the server 112 may directly transmit the stored message of the first call in the first format to the electronic device 102, without conversion to the second format. It may be noted that the 316 is described with respect to the received first call, as an example. The 316 may be applicable to other calls (such as the second call) that may be received on the electronic device 102 from the plurality of caller party devices 108.

At 318, the first challenge message transmission may be performed. The circuitry 202 of the electronic device 102 may be configured to transmit the first challenge message to the first caller party device 108A (associated with the first caller party 110) from where the first call may be originated or received. The first challenge message may be transmitted based on the fourth call setting 104D stored in the electronic device 102, as described, for example, at 310 in FIG. 3. The first challenge message may include, but is not limited to, an arithmetic question, a reasoning question, an audio related question, a timing related question, an image based question, a request to press a button question, or a logical question. As an example, the first challenge message may be "What is 2+2?". As another example, the first challenge message may be "What is the capital of the USA?". As another example, the first challenge message may be "Press 1 to proceed". In some embodiments, the first challenge message may also include a time limit (say 30 seconds) for the first caller party 110 to provide a first response of the transmitted first challenge message. The circuitry 202 may be configured to transmit the first challenge message to the first caller party device 108A to confirm whether the first caller party 110 is a robot or a human being, in addition to the determination performed at 304 and 310 in FIG. 3. The memory 204 of the electronic device 102 may be configured to store a plurality of questions. The circuitry 202 may be configured to select one of the plurality of questions from the memory 204 and include the selected question in the first challenge message. In an embodiment, the circuitry 202 may randomly select the question to be included in the first challenge message. In other embodiment, the circuitry 202 may select the question based on certain factors associated with the first caller party 110, the first caller party device 108A, or the first call. The factors may include, but are not limited to, geo-location of the first caller party device 108A identified based on the determined identification information, an educational or work domain of the first caller party 110 identified based on the determined identification information, an age or a gender of the first caller party 110 identified based on the determined identification information, last selected question to avoid repetition, a time of the receipt of the first call, or a software or hardware capability of the first caller party device 108A identified based on the determined identification information.

At 320, a first response reception operation may be executed. In the response reception operation, the circuitry 202 may receive the first response of the first challenge message from the first caller party device 108A associated with the first caller party 110. The first response may be received based on the transmitted first challenge message (i.e. which may include a question for the caller party to answer). The first caller party device 108A may be configured to receive user input from the first caller party 110, as the first response. The user input may correspond to, but not limited to, a press of a button, an audio response, or a touch-based input provided based on the first challenge message. For example, for the arithmetic question in the first challenge message, like "What is 2+2", the user input (as the first response) may be "4" received from the first caller party 110 based on button-press, audio input, or touch based input. In some embodiments, in case the first response is not received within the time limit included in the transmitted first challenge message, the circuitry 202 of the electronic device 102 may be configured to drop or reject the received first call as described at 314. The circuitry 202 may not receive the first response, in case the received first call is the robocall or the first caller party 110 is not the human being who may be capable to provide the first response based on the questions included in the first challenge message (i.e. transmitted from the electronic device 102 to the first caller party device 108A). The robot or the automated machine (i.e. from which may be the first call is originated) may not be programmed to provide the first response based on the received first challenge message which may be selected dynamically by the electronic device 102.

At 322, it may be determined whether the first response received from the first caller party device 108A (i.e. associated with the first caller party 110) is correct or not. The operation at 322 may correspond to the application of the first call setting 104A of the stored plurality of call settings 104. The first call setting 104A of the plurality of call settings 104 may be associated with the transmitted first challenge message and the received first response. In case the first response of the first challenge message provided by the first caller party 110 is an incorrect response, the first call setting 104A may include instructions to transfer the first call to the server 112 (i.e. voicemail) for storage. In case the first response of the first challenge message provided by the first caller party 110 is a correct response, the first call setting 104A may include instructions to transmit the second challenge message to the first caller party 110 to re-confirm that the first call is not the robocall, and further provide enhanced filtering of robocalls at the electronic device 102.

In an embodiment, the circuitry 202 may be configured to compare the received first response with a response indicated by the first call setting 104A related to the first challenge message. The response indicated by the first call setting 104A may correspond to a correct answer related to a particular question included in the first challenge message. The memory 204 of the electronic device 102 may be configured to store plurality of correct responses for the plurality of questions stored. In an embodiment, the response (i.e. correct answer) indicated by the first call setting 104A may be different from the first response received from the first caller party device 108A. In such a scenario, the first response received from the first caller party device 108A may be incorrect and therefore, the control may pass to 316. In another embodiment, the response indicated by the first call setting 104A may be same as the first response received from the first caller party device 108A. In such a scenario, the first response received from the first caller party device 108A may be correct and therefore, the control may pass to 324.

In accordance with an example, if the response indicated by the first call setting 104A may be '4' for the question, "What is 2+2," and if the received first response is other than '4', then the first call may be transmitted to the server 112 for storage and not alerted for the user 106. In case the received first response is '4', then the control may pass to 324 for further operations, such as (but not limited to) transmission of the second challenge message. In some embodiments, in case of receipt of the incorrect response from the first caller party device 108A, the circuitry 202 may be configured to re-transmit the same question or different question (i.e. in the first challenge message) for a predefined number of times (for example two or three times) to provide another opportunity to the first caller party 110 to provide the correct response in the first response. In case of receipt of incorrect responses for the predefined number of times, the circuitry 202 may transmit the first call to the server 112 for storage and drop the first call.

At 324, a second challenge message transmission operation may be performed. In the second challenge message transmission operation, the circuitry 202 may transmit the second challenge message to the first caller party 110, via the first caller party device 108A. The transmitted second challenge message may indicate a request for the first caller party 110 to call the electronic device 102 again within a threshold time period (say 15 minutes). The circuitry 202 may transmit the second challenge message to the first caller party device 108A based on the first call setting 104A as described, for example, at 332. Generally, there may be robots or the automated machine (as the caller of the first call) which may be pre-programmed to provide the first response correctly for the first challenge message. Therefore, to avoid receipt of the robocall in such situations, the stored first call setting 104A may control the electronic device 102 to transmit another challenge message (i.e. second challenge message) to again confirm or validate whether the first caller party 110 is a robotic machine or human being. The transmission of the second challenge message may provide an enhanced feature to the electronic device 102 to filter-out and avoid robocalls with high accuracy.

In an embodiment, with the transmission of the second challenge message, the circuitry 202 may be configured to store the identification information determined for the first call from the first caller party 110, the threshold time period indicated in the transmitted second challenge message (or indicated in the first call setting 104A), and the time of receipt of the first call in the memory 204. The time of receipt of the first call may include information about timestamp when the first call was received at the electronic device 102. In another embodiment, the time of receipt of the first call may include information about timestamp when the second challenge message may be transmitted to the first caller party 110.

At 326, a second call reception operation may be performed. In the second call reception operation, the circuitry 202 may receive a second call from a caller party device of the plurality of caller party devices 108, where the caller party device may be associated with a caller party.

At 328, it may be determined whether the second call is received from the first caller party device 108A associated with the first caller party 110. The circuitry 202 may determine the identification information associated with the second call in a similar way the identification information of the first call is determined, as described, for example, at 304. Based on the identification information associated with the second call, the circuitry 202 may compare the determined identification information (e.g. phone number) of the second call with the identification information (e.g. phone number) of the first call stored in the memory 204. If the identification information of the second call is different from the identification information of the first call, it may be considered that the second call is received from another caller party (or another caller party device of the plurality of caller party devices 108) that may be different from the first caller party 110. In such case, the control may pass to 304 again to consider the second call as the first call received from the different caller party device. In case the identification information of the second call is same as the identification information of the first call, the control may pass to 330 to determine the time of receipt of the second call. The similarity in the identification information of both the first call and the second call may indicate that the call may be received from the first caller party device 108A again as requested by the transmitted second challenge message (at 324) to validate that the first caller party 110 as human. In an embodiment, the circuitry 202 may compare the determined identification information of the second call with the identification information of the first call as per instructions or rules set in the second call setting 104B of the plurality of call settings 104.

At 330, a time of reception determination operation may be performed. In the time of reception determination operation, the circuitry 202 may be configured to determine the time of receipt of the second call received from the first caller party device 108A by the electronic device 102. The circuitry 202 may be configured to determine the time of reception of the second call based on instructions set in the second call setting 104B of the plurality of call settings 104. The second call setting 104B may be different from the first call setting 104A, the third call setting 104C, and the fourth call setting 104D described, for example, at 302 to 328 in FIG. 3.

At 332, it may be determined whether the time of receipt of the second call is within the threshold time period indicated in the transmitted second challenge message or in the first call setting 104A. The operation at 332 may correspond to the application of the second call setting 104B of the stored plurality of call settings 104. The second call setting 104B may be associated with the time of reception of the second call from the first caller party device 108A based on the transmission of the second challenge message (at 324). In case the time of reception of the second call is not within the threshold time period as indicated in the second challenge message, the second call setting 104B may include the instructions to transfer the first call to the server 112 (i.e. voicemail) for storage (i.e. 316). The time of reception of the second call not being within the threshold time period may indicate that the first caller party 110 (i.e. who may be a human and from whom the second call received) may not comply with instructions or request mentioned in the second challenge message to call again within the threshold time case. In such case, as per the pre-configured second call setting 104B, the circuitry 202 may not generate the alert for the second call, transmit the second call to the server 112 for storage, and may further drop the second call on the electronic device 102. In case the time of reception of the second call is within the threshold time period indicated in the second challenge message, the circuitry 202 may generate the alert about the second call for the second call as per the second call setting 104B.

In an embodiment, the circuitry 202 may determine the time of receipt of the first call and the second call received from the first caller party device 108A. The circuitry 202 may further calculate a time difference (e.g. 20 mins) between the time of receipt (e.g. 5:00 PM) of the first call and the time of receipt (e.g. 5:20 PM) of the second call received from the first caller party device 108A. Based on the calculation of the time difference, the circuitry 202 may compare the calculated time difference with the threshold time period. If the calculated time difference (for example 20 mins) is greater than the threshold time period (for example 15 mins), the circuitry 202 may transfer the second call to the server 112 for storage, as the first caller party device 108A or the first caller party 110 did not comply with instructions or request mentioned in the second challenge message to call again with the threshold time period. On the other hand, if the calculated time difference is less than or equal to the threshold time period, the control may pass to 308 and the circuitry 202 may generate the alert on the electronic device 102 about the second call for the user 106. In a case where the user 106 does not pick the second call with a particular time period, the circuitry 202 may automatically transmit the second call to the server 112 for storage. Therefore, as per the second call setting 104B, the disclosed electronic device 102 may control the second call based on the threshold time period and comparison of the determined time of receipts of the first call and the second call.

Therefore, based on the pre-configured plurality of call settings 104, the disclosed electronic device 102 may provide the three-step approach (i.e. determination of the identification information and control of the first and second challenges messages) to identify and filter-out potential robocalls. Also, the disclosed electronic device 102 may not disturb or alert the user 106 until the first caller party 110 (or the first caller party device 108A) is known to the electronic device 102 or the second call is received from the first caller party device 108A within the threshold time period. Moreover, the disclosed electronic device 102 also controls all the incoming calls (either robocalls or human calls) with the storage in the server 112 based on the plurality of call settings 104. The automatic storage of the calls on the server 112 (i.e. voicemail) based on the plurality of call settings 104 may further prevent any loss of important calls or related information which may occur due to filtering of robocalls in the electronic device 102. The electronic device 102 may further allow the retrieval of the stored calls in the same form or in message or email form as described, for example, at 316. Thus, the disclosed electronic device 102 may allow the user 106 to be aware of all the incoming calls that may be processed by the electronic device 102 as filtered robocalls or sent to the server 112 for storage.

In some embodiments, the electronic device 102 may be associated with a plurality of users. Each user of the plurality of users may be able to configure the plurality of call settings 104 according to their own preference. The electronic device 102 may be configured to store the plurality of call settings 104 associated with each user in the memory 204. The configured plurality of call settings 104 may be different for each user and/or the corresponding plurality of call settings 104 may be associated with a user profile of each user. Therefore, when an incoming call is received, the circuitry 202 may determine the user profile associated with a current user of the electronic device 102 and may retrieve the plurality of call settings 104 associated with the determined user profile. The circuitry 202 may further handle each incoming call based on the retrieved plurality of call settings 104 as described, for example, at 302 to 332 in FIG. 3.

In some embodiments, if the first caller party 110 is determined as a human, the circuitry 202 may receive a user request from the user 106 to store the identification information of the first caller party 110 in the contact list (or whitelist) in the memory 204. The circuitry 202 may further store the identification information of the first call (or the second call) in the memory 204 of the electronic device 102 based on the received user request. Therefore, when an incoming call may be received from the first caller party device 108A associated with the first caller party 110 (i.e. for whom the identification information is stored in the whitelist), the circuitry 202 of the electronic device 102 may only apply the third call setting 104C and further alert the user 106 about the incoming call instantly. Further, in such case, the first caller party device 108A may not have to provide the first response and call again within the threshold time period to communicate with the user 106 of the electronic device 102, as the identification information of the first caller party device 108A may be stored in the contact list of the electronic device 102 as white-listed caller.

Figure 4:
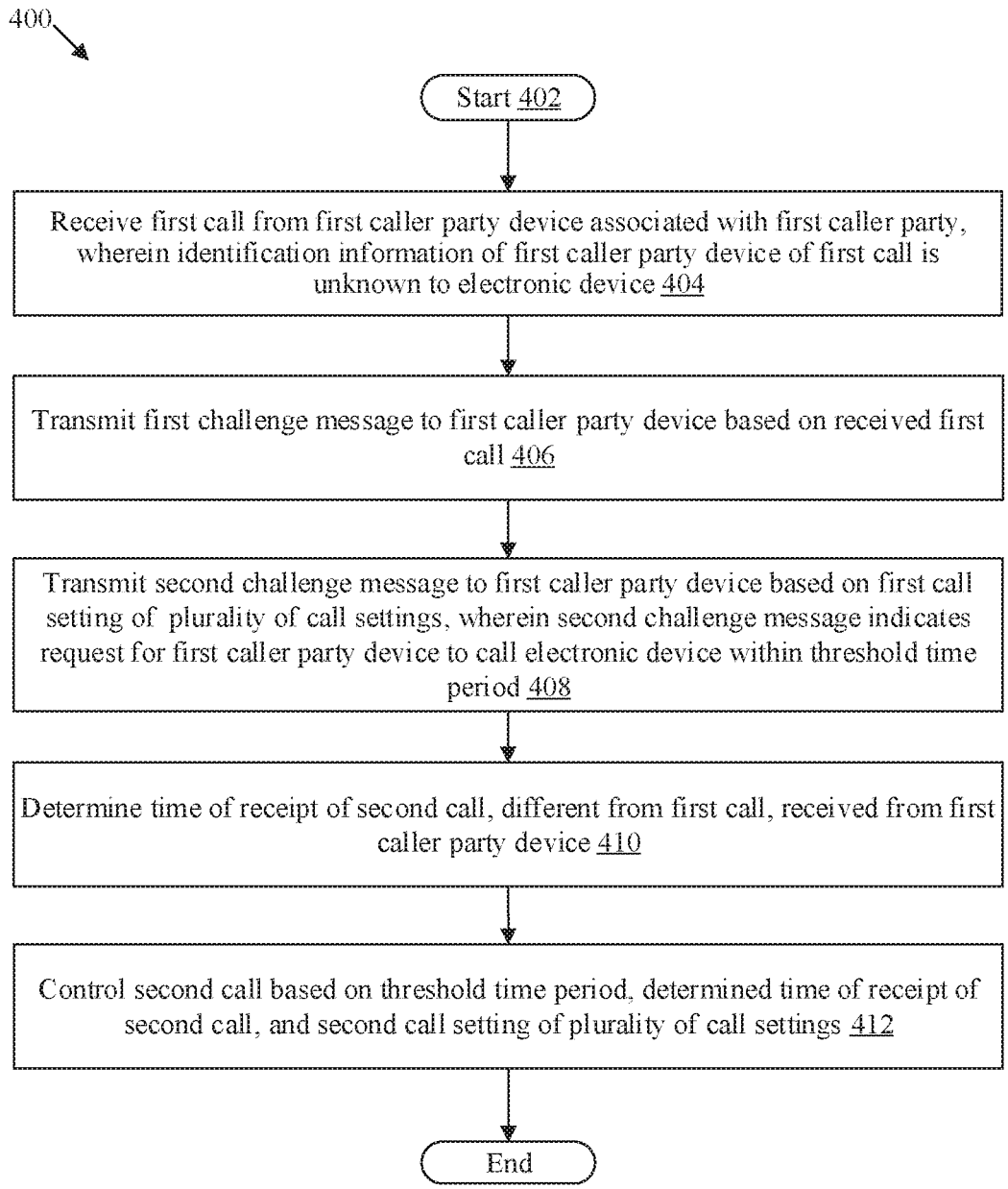
FIG. 4 is a flowchart that illustrates exemplary operations for control of incoming calls based on call settings, in accordance with an embodiment of the disclosure.

FIG. 4 is a flowchart that illustrates exemplary operations for control of incoming calls based on call settings, in accordance with an embodiment of the disclosure. FIG. 4 is explained in conjunction with elements from FIGS. 1, 2, and 3. With reference to FIG. 4, there is shown a flowchart 400. The operations from 402 to 412 may be implemented by any computing system, such as by the electronic device 102 of FIG. 1 or circuitry 202 of FIG. 2. The operations may start at 402 and may proceed to 404.

At 404, the first call may be received from the first caller party device 108A that may be associated with the first caller party 110. The identification information of the first caller party device 108A may be unknown to the electronic device 102. In at least one embodiment, the circuitry 202 may be configured to receive the first call on the electronic device 102 from the first caller party device 108A associated with the first caller party 110, wherein the identification information of the first caller party 110 of the first call is unknown to the electronic device 102 as described, for example, in FIG. 3.

At 406, the first challenge message may be transmitted to the first caller party device 108A based on the received first call. In at least one embodiment, the circuitry 202 may be configured to transmit the first challenge message to the first caller party device 108A associated with the first caller party 110 based on the received first call as described, for example, in FIG. 3.

At 408, the second challenge message may be transmitted to the first caller party device 108A based on the first call setting 104A of the plurality of call settings 104. The first call setting may be associated with the transmitted first challenge message. The second challenge message may indicate the request for the first caller party device 108A to call the electronic device 102 back within the threshold time period. In at least one embodiment, the circuitry 202 may be configured to transmit the second challenge message to the first caller party device 108A associated with the first caller party 110 based on the first call setting 104A of the plurality of call settings 104 as described, for example, in FIG. 3.

At 410, the time of receipt of the second call may be determined. The second call may be different from the first call and may be received from the first caller party device 108A. In at least one embodiment, the circuitry 202 may be configured to determine the time of receipt of the second call, different from the first call, received from the first caller party 110 as described, for example, in FIG. 3.

At 412, the second call may be controlled based on the threshold time period, the determined time of receipt of the second call, and the second call setting 104B of the plurality of call settings 104. In an embodiment, the circuitry 202 may be configured to control the second call based on the threshold time period, the determined time of receipt of the second call, and the second call setting 104B of the plurality of call settings 104 as described, for example, in FIG. 3. Control may pass to end.

Various embodiments of the disclosure may provide a non-transitory computer-readable medium and/or storage medium having stored thereon, instructions executable or implemented by a machine and/or a computer (for example the electronic device 102). The instructions may cause the machine and/or computer to perform operations that include reception of a first call from a first caller party device associated with a first caller party, wherein identification information of the first caller party device of the first call may be unknown to the electronic device. The operations may further include transmission of a first challenge message to the first caller party device based on the received first call. The operations may further include transmission of a second challenge message to the first caller party device based on a first call setting of a plurality of call settings. The first call setting may be associated with the transmitted first challenge message. The second challenge message may indicate a request for the first caller party device to call the electronic device back within a threshold time period. The operations may further include determination of a time of receipt of a second call that may be different from the first call and may be received from the first caller party device. The operations may further include control of the second call based on the threshold time period, the determined time of receipt of the second call, and a second call setting of the plurality of call settings.

Exemplary aspects of the disclosure may include an electronic device (such as the electronic device 102 of FIG. 1) that may include circuitry (such as the circuitry 202) that may be communicatively coupled to a memory (such as the memory 204 of FIG. 2). The memory may be configured to store a plurality of call settings (such as the plurality of call settings 104 of FIG. 1) to handle incoming calls. The circuitry may be configured to receive a first call from a first caller party device (such as the first caller party device 108A of FIG. 1) associated with a first caller party (such as the first caller party 110 of FIG. 1). The identification information of the first caller party device of the first call may be unknown to the electronic device. The circuitry may be further configured to determine the identification information of the first caller party device from the received first call. The circuitry may be further configured to control the first call based on the determined identification information and a third call setting (such as the third call setting 104C of FIG. 1) of the stored plurality of call settings. The third call setting may be different from the first call setting and the second call setting.

In accordance with an embodiment, the circuitry may be configured to receive the identification information of the first caller party from a server associated with the electronic device. The circuitry may be further configured to control the first call based on the received identification information and the third call setting of the stored plurality of call settings.

In accordance with an embodiment, the circuitry may be configured to retrieve a fourth call setting (such as the fourth call setting 104D of FIG. 1) from the stored plurality of call settings. The retrieved fourth call setting may indicate a user preference for each call for which the corresponding identification information is unknown to the electronic device. In an embodiment, the circuitry may be further configured to transmit the received first call to a server (such as the server 112 of FIG. 1) based on the retrieved fourth call setting. In another embodiment, the circuitry may be further configured to transmit the first challenge message to the first caller party device based on the retrieved fourth call setting that may indicate the user preference.

In accordance with an embodiment, the circuitry may be further configured to receive a first response of the first challenge message from the first caller party device based on the transmitted first challenge message. The circuitry may be further configured to compare the received first response with a response indicated by the first call setting related to the first challenge message. In an embodiment, the circuitry may be further configured to transmit the first call to the server based on the comparison. In another embodiment, the circuitry may be further configured to transmit the second challenge message to the first caller party device based on the comparison. The second challenge message may indicate a request for the first caller party to call the electronic device back within a threshold time period. In accordance with an embodiment, the circuitry may be further configured to receive the second call. The circuitry may be further configured to compare the identification information in the first call and in the second call. The circuitry may be further configured to determine the time of receipt of the second call based on the comparison.

In accordance with an embodiment, the circuitry may be further configured to determine a time of receipt of the first call received from the first caller party device. The circuitry may be further configured to compare a time difference between the time of receipt of the first call and the time of receipt of the second call with the threshold time period. The circuitry may be further configured to control the second call based on the comparison of the time difference and threshold time period. The circuitry may be further configured to control the second call based on the threshold time period, the determined time of the receipt of the second call, and a second call setting of the stored plurality of call settings. The control of the second call corresponds to generation of an alert on the electronic device about the second call or corresponds to a transmission of the second call to the server.

In accordance with an embodiment, the circuitry may be further configured to transmit a request to the server to retrieve at least one of the first call or the second call stored on the server. The server may convert one of the stored first call or the stored second call from a first format to a second format based on the request received from the electronic device and transmit one of the converted first call or the converted second call in the second format to the electronic device based on the transmitted request. The server may be a network voicemail and the second format may be a textual format. In accordance with an embodiment, the circuitry may be further configured to receive a user request to store the identification information of the first caller party device. The circuitry may be further configured to control the memory to store the identification information of the first call based on the received user request.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
a memory configured to store a plurality of call settings to handle incoming calls;
circuitry coupled with the memory, wherein the circuitry is configured to:
receive a first call from a first caller party device associated with a first caller party, wherein identification information of the first caller party device of the first call is unknown to the electronic device;
transmit a first challenge message to the first caller party device based on the received first call;
transmit a second challenge message to the first caller party device based on a first call setting of the stored plurality of call settings, wherein the first call setting is associated with the transmitted first challenge message,
wherein the second challenge message indicates a request for the first caller party to call the electronic device back within a threshold time period;
determine a time of receipt of a second call, different from the first call, received from the first caller party device; and
control the second call based on the threshold time period, the determined time of the receipt of the second call, and a second call setting of the stored plurality of call settings.

2. The electronic device according to claim 1, wherein the first challenge message comprises at least one of an arithmetic question, a reasoning question, an audio related question, a timing related question, an image based question, a request to press a button question, or a logical question.

3. The electronic device according to claim 1, wherein the circuitry is further configured to:
determine the identification information of the first caller party device from the received first call; and
control the first call based on the determined identification information and a third call setting of the stored plurality of call settings, wherein the third call setting is different from the first call setting and the second call setting.

4. The electronic device according to claim 3, wherein the circuitry is further configured to:
receive the identification information of the first caller party device from a server associated with the electronic device; and
control the first call based on the received identification information and the third call setting of the stored plurality of call settings.

5. The electronic device according to claim 1, wherein the circuitry is further configured to:
retrieve a fourth call setting from the stored plurality of call settings, wherein the retrieved fourth call setting indicates a user preference for each call for which the identification information is unknown to the electronic device; and
transmit the received first call to a server based on the retrieved fourth call setting.

6. The electronic device according to claim 5, wherein the circuitry is further configured to transmit the first challenge message to the first caller party device based on the retrieved fourth call setting which indicates the user preference.

7. The electronic device according to claim 1, wherein the circuitry is further configured to:
receive a first response of the first challenge message from the first caller party device based on the transmitted first challenge message;
compare the received first response with a response indicated by the first call setting related to the first challenge message; and
transmit the second challenge message to the first caller party device based on the comparison.

8. The electronic device according to claim 1, wherein the circuitry is further configured to:
receive a first response of the first challenge message from the first caller party device based on the transmitted first challenge message;
compare the received first response with a response indicated by the first call setting related to the first challenge message; and
transmit the first call to a server based on the comparison.

9. The electronic device according to claim 1, wherein the circuitry is further configured to:
compare the identification information of the first call and the identification information of the second call; and
determine the time of receipt of the second call based on the comparison.

10. The electronic device according to claim 1, wherein the circuitry is further configured to:
determine a time of receipt of the first call received from the first caller party device;
determine the time of receipt of the second call received from the first caller party device;
compare a time difference, between the time of receipt of the first call and the time of receipt of the second call, with the threshold time period; and
control the second call based on the comparison of the time difference and threshold time period.

11. The electronic device according to claim 1, wherein the control of the second call corresponds to generation of an alert on the electronic device about the second call or corresponds to a transmission of the second call to a server.

12. The electronic device according to claim 11, wherein the circuitry is further configured to:
transmit a request to the server to retrieve at least one of the first call or the second call stored on the server, wherein the server:
converts one of the stored first call or the stored second call from a first format to a second format based on the request received from the electronic device; and
transmits one of the converted first call or the converted second call in the second format to the electronic device based on the transmitted request.

13. The electronic device according to claim 12, wherein the server is a network voicemail and the second format is a textual format.

14. The electronic device according to claim 1, wherein the circuitry is further configured to:
receive a user request to store the identification information of the first caller party; and control the memory to store the identification information of the first call based on the received user request.

15. A method, comprising:
in an electronic device:
receiving a first call from a first caller party device associated with a first caller party, wherein identification information of the first caller party device of the first call is unknown to the electronic device;
transmitting a first challenge message to the first caller party device based on the received first call;
transmitting a second challenge message to the first caller party device based on a first call setting of a plurality of call settings, wherein the first call setting is associated with the transmitted first challenge message,
wherein the second challenge message indicates a request for the first caller party to call the electronic device back within a threshold time period;
determining a time of receipt of a second call, different from the first call, received from the first caller party device; and
controlling the second call based on the threshold time period, the determined time of receipt of the second call, and a second call setting of the plurality of call settings.

16. The method according to claim 15, further comprising:
receiving the identification information of the first caller party device from a server associated with the electronic device; and
controlling the first call based on the received identification information and a third call setting of the plurality of call settings, wherein the third call setting is different from the first call setting and the second call setting.

17. The method according to claim 15, further comprising:
determining a time of receipt of the first call received from the first caller party device;
determining the time of receipt of the second call received from the first caller party device;
comparing a time difference, between the time of receipt of the first call and the time of receipt of the second call with the threshold time period; and
controlling the second call based on the comparison of the time difference and threshold time period.

18. The method according to claim 15, wherein the control of the second call corresponds to generation of an alert on the electronic device about the second call or corresponds to a transmission of the second call to a server.

19. The method according to claim 18, further comprising:
transmitting a request to the server to retrieve at least one of the first call or the second call stored on the server, wherein the server:
converts one of the stored first call or the stored second call from a first format to a second format based on the request received from the electronic device; and
transmits one of the converted first call or the converted second call in the second format to the electronic device based on the transmitted request.

20. A non-transitory computer-readable medium having stored thereon computer implemented instructions that, when executed by an electronic device, causes the electronic device to execute operations, the operations comprising:
receiving a first call from a first caller party device associated with a first caller party, wherein identification information of the first caller party device of the first call is unknown to the electronic device;
transmitting a first challenge message to the first caller party device based on the received first call;
transmitting a second challenge message to the first caller party device based on a first call setting of a plurality of call settings, wherein the first call setting is associated with the transmitted first challenge message,
wherein the second challenge message indicates a request for the first caller party to call the electronic device back within a threshold time period;
determining a time of receipt of a second call, different from the first call, received from the first caller party device; and
controlling the second call based on the threshold time period, the determined time of receipt of the second call, and a second call setting of the plurality of call settings.

* * * * *